United States Patent [19]
Bower

[11] Patent Number: 6,111,032
[45] Date of Patent: Aug. 29, 2000

[54] TERTIARY AMINE POLYAMIDOAMINE-EPIHALOHYDRIN POLYMERS

[75] Inventor: Barton K. Bower, Little Britain Township, Pa.

[73] Assignee: Hercules Incorporated, Wilmington, Del.

[21] Appl. No.: 09/071,902

[22] Filed: May 4, 1998

[51] Int. Cl.⁷ .................................................. C08L 77/00
[52] U.S. Cl. ........................................ 525/430; 525/420
[58] Field of Search ............................................. 525/430

[56] References Cited

U.S. PATENT DOCUMENTS

| | | |
|---|---|---|
| 3,240,664 | 3/1966 | Earle, Jr. . |
| 3,311,594 | 3/1967 | Earle, Jr. . |
| 3,332,901 | 7/1967 | Keim . |
| 3,640,840 | 2/1972 | Zieman et al. . |
| 3,700,623 | 10/1972 | Keim . |
| 3,772,076 | 11/1973 | Keim . |
| 3,833,531 | 9/1974 | Keim . |
| 3,840,504 | 10/1974 | Keim . |
| 3,966,684 | 6/1976 | Espy et al. . |
| 3,966,694 | 6/1976 | Espy et al. ............................... 526/11.2 |
| 4,184,019 | 1/1980 | Meteyer et al. ........................... 521/34 |
| 4,222,921 | 9/1980 | Van Eanam . |
| 4,388,439 | 6/1983 | Maslanka ................................. 524/845 |
| 4,487,884 | 12/1984 | Maslanka ................................ 524/845 |
| 4,501,862 | 2/1985 | Keim ....................................... 525/430 |
| 4,515,657 | 5/1985 | Maslanka .............................. 162/164.3 |
| 4,537,657 | 8/1985 | Keim ..................................... 162/164.3 |
| 4,605,709 | 8/1986 | Maslanka ................................. 525/430 |
| 4,708,772 | 11/1987 | Maslanka .............................. 162/164.3 |
| 4,975,499 | 12/1990 | Bachem et al. .......................... 525/430 |
| 5,316,623 | 5/1994 | Espy ..................................... 162/164.3 |

FOREIGN PATENT DOCUMENTS

| | | |
|---|---|---|
| 999300 | 11/1976 | Canada . |
| 0127129 | 12/1984 | European Pat. Off. . |
| 1595336 | 9/1970 | Germany . |
| 43-28476 | 6/1943 | Japan . |

OTHER PUBLICATIONS

An English Language Abstract of JP 43–28476.
An English Language Abstract of German Patent No. 1,595,336.

*Primary Examiner*—Ana Woodward
*Attorney, Agent, or Firm*—Greenblum & Bernstein, P.L.C.

[57] ABSTRACT

A process for preparing a tertiary amine polyamidoamine-epihalohydrin polymer having a low level of epihalohydrin byproducts. In this process a tertiary amine polyamidoamine prepolymer is reacted with an epihalohydrin; the molar ratio, of epihalohydrin to tertiary amine groups in the polyamidoamine prepolymer, is less than 1.0 to 1.0. The reaction is further conducted at a pH of from about 7.5 to less than about 9.0, in the presence of a nonhalide acid, and at a temperature of not more than about 35° C.

32 Claims, No Drawings

TERTIARY AMINE POLYAMIDOAMINE-EPIHALOHYDRIN POLYMERS

BACKGROUND OF THE INVENTION

1. Field of the Invention

The present invention relates to tertiary amine polyamidoamine-epihalohydrin polymers, and to the preparation of tertiary amine polyamidoamine-epihalohydrin polymers.

2. Description of Background and Other Information

Polymers obtained by reacting epihalohydrins with prepolymers prepared from tertiary amines and dicarboxylic acids and/or their derivatives are known in the art. The use of these polymers as wet strength agents for paper is also known.

U.S. Pat. Nos. 4,537,657 and 4,501,862 disclose paper wet strength resins prepared by reacting epihalohydrin with tertiary amine polyamidoamine prepolymers derived from methylbisaminopropylamine with oxalic acid or its ester and urea. A water soluble acid such as hydrochloric acid is added to tertiary amine polyamidoamine prepolymer, in an amount essentially equivalent to the tertiary amines of the tertiary amine polyamidoamine prepolymer; nonhalide acids such as sulfuric, phosphoric, and nitric acids are also taught as being suitable. The pH of the aqueous solution of intermediate is disclosed as usually being adjusted to about 8.5 to about 9.6 before or immediately after the addition of the epihalohydrin. These patents further disclose, in the reaction of epihalohydrin and tertiary amine polyamidoamine prepolymer, the use of sufficient epihalohydrin to convert all tertiary amine groups to quaternary ammonium groups; from about 1 mole to 1.5 moles of epihalohydrin, per mole of tertiary amine of the intermediate, is indicated to be satisfactory. The temperature of the reaction medium is maintained from about 40° C. to about 100° C., until the Gardner-Holdt viscosity of a 25% solids solution at 25° C. has reached about E–F.

U.S. Pat. Nos. 3,311,594 and 3,332,901 disclose wet strength resins prepared by reacting epichlorohydrin with a polyamide, the polyamide being prepared from a polyamine with at least one tertiary amino group and saturated aliphatic dicarboxylic acid. The polyamide is reacted with epichlorohydrin at a temperature of from about 25° C. to about 70° C., until the viscosity of a 20% solid solution at 25° C. has reached about C or higher on the Gardner-Holdt scale. These patents further teach that the reaction may also be moderated by adding acid prior to the addition of epichlorohydrin or immediately after the addition of epichlorohydrin, to decrease the pH usually to pH 8.5–9.5, but in certain instances to 7.5. Corresponding to the teaching of U.S. Pat. Nos. 4,537,657 and 4,501,862, the amount of epichlorohydrin disclosed as being employed is indicated preferably to be sufficient to react with substantially all of the tertiary amine groups. It is further taught that addition of more or less epichlorohydrin is permissible to moderate or increase reaction rates. From about 0.8 mole to about 2.0 moles of epichlorohydrin per mole of polyamide amine is disclosed as being generally contemplated.

SUMMARY OF THE INVENTION

The present invention pertains to a process for preparing a tertiary amine polyamidoamine-epihalohydrin polymer characterized by low epihalohydrin byproduct content. In the process of the invention, a tertiary amine polyamidoamine (PAA) prepolymer is reacted with an epihalohydrin, with the epi:tertiary amine molar ratio being less than 1.0 to 1.0. Also during the reaction of the prepolymer and epihalohydrin, the pH is maintained in a range of from about 7.5 to less than about 9.0. Yet further, this reaction is conducted in the presence of at least one nonhalide acid, and at a temperature sufficiently low to permit termination of the reaction prior to gelation. Preferably, this reaction is conducted at a temperature of not more than about 35° C.

Preferably, the prepolymer and epihalohydrin reaction is conducted in the absence or substantial absence of halide acid. Also as a matter of preference, the pH is maintained in the indicated range of from about 7.5 to less than about 9.0 by adding, during the reaction of the polyamidoamine prepolymer and the epihalohydrin, at least one base and/or at least one nonhalide acid. Yet further as a matter of preference, the reaction of the polyamidoamine prepolymer and the epihalohydrin is terminated by the addition of sufficient acid to convert all, or at least substantially all, oxirane groups in the reaction to halohydrin groups.

As a matter of particular preference, the acid used for terminating the epi and prepolymer reaction is one or more nonhalide acids. Halide acid accordingly remains absent, or substantially absent, from the reaction mixture, and the epihalohydrin byproduct content—particularly the 1,3-dihalo-2-propanol (1,3 DHP) content—is correspondingly reduced in the polymer product.

The tertiary amine polyamidoamine prepolymer preferably comprises the reaction product of at least one tertiary amine polyalkylenepolyamine with at least one dicarboxylic saturated aliphatic acid and/or at least one nonacyl halide dicarboxylic saturated aliphatic acid derivative. As to both the acids and the nonacyl halide derivatives, $C_1$–$C_{12}$ saturated aliphatic dicarboxylic acids are preferred. Suitable nonacyl halide derivatives include the esters and amides.

DESCRIPTION OF THE INVENTION

The polymers of the invention are tertiary amine polyamidoamine epihalohydrin polymers. They can be obtained by reaction of a tertiary amine polyamidoamine prepolymer with epihalohydrin. Tertiary amine polyamidoamine prepolymers suitable for this purpose can be prepared by condensation polymerization, or polycondensation, of dicarboxylic acids and/or nonacyl halide dicarboxylic acid derivatives with tertiary amine polyalkylenepolyamines. Specifically, one or more dicarboxylic acids, and/or one or more nonacyl halide dicarboxylic acid derivatives, undergo amide formation with one or more tertiary amine polyalkylenepolyamines of the invention.

The dicarboxylic acids and nonacyl halide dicarboxylic acid derivatives of the invention comprise two amide forming groups. It is understood that "nonacyl halide dicarboxylic acid derivatives" means the dicarboxylic acid derivatives other than acyl halide dicarboxylic acid derivatives. As further discussed herein, nonacyl halide dicarboxylic acid derivatives which can be used include ester derivatives and amide derivatives of dicarboxylic acids. Also as further discussed herein, acyl halide dicarboxylic acid derivatives should be absent or substantially absent from the reaction with the tertiary amine polyalkylene-polyamines, because in reacting with tertiary amine polyalkylenepolyamines they produce halide ions, which are harmful.

The amide forming groups of the dicarboxylic acids of the invention comprise carboxyl groups. The dicarboxylic acids are the saturated aliphatic dicarboxylic acids, particularly the $C_1$–$C_{12}$ saturated aliphatic dicarboxylic acids. Particular $C_1$–$C_{12}$ saturated aliphatic dicarboxylic acids which are suitable include carbonic, oxalic, malonic, succinic, glutaric, adipic, pimelic, suberic, azelaic, sebacic, and diglycolic acids.

The nonacyl halide dicarboxylic acid derivatives of the invention are the nonacyl halide dicarboxylic acid derivatives of the indicated dicarboxylic acids. Suitable nonacyl halide derivatives include the ester and amide derivatives.

In the case of ester derivatives, the amide forming groups comprise ester groups. Ester derivatives of dicarboxylic acids which may be used include the $C_1$–$C_3$ diesters of the saturated aliphatic dicarboxylic acids, especially the $C_1$–$C_{12}$ saturated aliphatic dicarboxylic acids. Particular diesters which are suitable include dimethyl carbonate, dimethyl adipate, diethyl oxalate, dimethyl malonate, diethyl malonate, dimethyl succinate, diethyl succinate, and dimethyl glutarate.

With the amide derivatives, the amide forming groups are amide groups, such as amide forming primary amide groups. An amide derivative which may be used is urea.

The polyalkylenepolyamines of the invention are tertiary amine polyalkylenepolyamines, comprising at least one tertiary amine group and at least two amide forming amine groups. Preferably the amide forming amine groups are selected from the group consisting of primary and secondary amine groups; more preferably the amide forming amine groups are primary amine groups.

The polyalkylenepolyamines of the invention further comprise at least one epihalohydrin reactive amine group. Preferably, the at least one tertiary amine group comprises the at least one epihalohydrin reactive amine group.

Suitable polyalkylenepolyamines of the invention include the tertiary amine polyalkylenepolyamines wherein the at least one tertiary amine group comprises the at least one epihalohydrin reactive amine group, and also wherein the at least two amide forming amine groups comprise at least two primary amine groups. Especially preferred tertiary amine polyalkylenepolyamines are those having one tertiary amine group which is the epihalohydrin reactive amine group, and also having two primary amine groups. Particular suitable tertiary amine polyalkylenepolyamines include N, N-bis (3-aminopropyl)methylamine (MBAPA) and N,N-bis (2-aminoethyl)methylamine.

Epihalohydrins suitable for the invention include epichlorohydrin, epibromohydrin, and epiiodohydrin. Of these, epichlorohydrin is preferred.

With reference to the dicarboxylic acid and/or nonacyl halide derivative used in preparing the prepolymer of the invention, it is preferred that both oxalic acid and urea be included; the molar ratio of urea and oxalic acid which is employed is preferably in the range from about 60:40 to about 40:60. The preferred tertiary amine polyalkylenepolyamine for preparing the prepolymer is MBAPA.

The molar ratio of total diacid and nonacyl halide derivative to total polyalkylenepolyamine is preferably in the range of about 0.9:1 to about 1.2:1. More preferably, this molar ratio is 1:1, or about 1:1. One of these can be used in excess of the other to lower the molecular weight of the resulting prepolymer.

In amide formation, amide forming groups from the one or more diacids, and/or from the one or more nonacyl halide diacid derivatives, react with amide forming groups of the one or more polyalkylenepolyamines, to form amide functionalities. In this context, amide forming groups are understood as including the diacid groups, and/or the nonacyl halide diacid derivative groups, and the polyalkylenepolyamine groups, which undergo amide formation.

Where diacid is used, amide formation releases water in forming the amide functionality. For ester derivatives of diacids, alcohols result. With amide derivatives of diacids, ammonia is released.

The acyl halide dicarboxylic acid derivatives should be absent or substantially absent from the amide-forming reaction, because their reaction with tertiary amine polyalkylenepolyamine would produce halide acids, which in turn would disassociate to provide halide ions. Halide ions are disadvantageous because they react with epihalohydrin to give DHP's, as discussed herein.

The polycondensation reaction of dicarboxylic acid and/or nonacyl halide derivative with polyalkylenepolyamine thusly provides a prepolymer comprising polymer chains which include alternating amide and tertiary amine groups. Preferably, the prepolymers of the invention are prepared in the absence, or at least in the substantial absence, of halide acid. Also as a matter of preference, the prepolymers of the invention are soluble in water.

As indicated, the polyalkylenepolyamines of the invention are tertiary amine polyalkylenepolyamines. Accordingly, the polyamidoamine prepolymers of the invention are tertiary amine polyamidoamine prepolymers. The molecular weight of the prepolymers of the invention can be correlated with the reduced specific viscosity (RSV) of prepolymer solutions.

Acid may be employed to prevent amide hydrolysis and loss of intrinsic viscosity of aqueous polyamidoamine prepolymers during storage. Nonhalide acids are preferred for this purpose. Suitable nonhalide acids include nitric, phosphoric, and sulfuric acids.

The reaction of prepolymer and epihalohydrin, to obtain the tertiary amine polyamidoamine-epihalohydrin polymers of the invention, is conducted under conditions which include the following:

the molar ratio of epihalohydrin, to tertiary amine groups in the prepolymer, is less than 1.0:1.0. This molar ratio can be from about 0.7:1.0 to less than 1.0:1.0, or from about 0.75:1.0 or about 0.76:1 to less than 1.0:1.0. This molar ratio can also be from about 0.7:1.0 to 0.99:1.0, or from about 0.75:1.0 or about 0.76:1 to 0.99:1.0. Further, this molar ratio can be from about 0.7:1.0 to about 0.95:1.0, or from about 0.75:1.0 or about 0.76:1 to about 0.95:1.0. Yet additionally, this molar ratio can be from about 0.8:1.0 to less than 1.0:1.0, or from about 0.8:1.0 to about 0.95:1.0. Preferably, this molar ratio is from about 0.8:1.0 to 0.99:1.0, and more preferably from about 0.85:1 to about 0.95:1. As a matter of particular preference, this molar ratio is about 0.9:1.

the reaction of prepolymer and epihalohydrin is conducted at a pH of from about 7.5 to less than about 9.0. Preferably, the reaction is conducted at a pH in the range of about 7.5 to about 8.75, or about 7.5 to about 8.5, or about 8.0 to about 8.5. The pH is maintained within the intended range throughout the prepolymer and epihalohydrin reaction. Particularly, as a matter of preference, the pH is maintained within this intended range from before the combination of epihalohydrin and prepolymer, until the requisite amount of crosslinking has been effected—specifically, until the reaction of prepolymer and epihalohydrin has reached its final viscosity target. The target Brookfield viscosity at 25° C. for a final product having an organic solids content of 25% is 50 to 200 cP, or about 50 cP to about 200 cP.

the reaction of prepolymer and epihalohydrin is conducted in the presence of a nonhalide acid. Preferably, halide acids are absent, or substantially absent, from the reaction of the prepolymer and epihalohydrin. Also as a matter of preference, when sufficient acid is added to the stop the reaction between prepolymer and epihalohydrin, the acid employed for this purpose is a nonhalide acid.

the reaction of prepolymer and epihalohydrin is conducted at a temperature sufficiently low to permit termination of this reaction prior to gelation of the tertiary amine polyamidoamine-epihalohydrin polymer. Preferably, the prepolymer and epihalohydrin reaction is conducted at a temperature of about 35° C. or less. Preferably, the reaction temperature is in the range of about 20° C. to about 35° C.

Employing an epi:amine ratio of less than 1.0:1.0 is crucial to the objective of minimizing epihalohydrin byproducts in the final product. This parameter is required in order for the other above-noted parameters, pertaining to pH range, temperature range, and presence and absence of nonhalide and halide acid, also to be effective in reducing epihalohydrin byproducts.

As noted herein, epichlorohydrin is the preferred epihalohydrin for the invention. Accordingly, for the sake of convenience, there is subsequent discussion herein referring to epichlorohydrin and epichlorohydrin byproducts. However, it is emphasized that this discussion does also pertain to epihalohydrins and epihalohydrin byproducts generally.

The epichlorohydrin byproducts include the four monomers epichlorohydrin (epi), 1,3-dichloro-2-propanol (1,3 DCP), 2,3-dichloro-1-propanol (2,3 DCP), and 3-chloropropane-1,2-diol (CPD). Both the DCP's and CPD are toxic. Although both DCP isomers are harmful, about 99% of the DCP's that form will be 1,3 DCP, so this isomer is of more concern than 2,3 DCP.

Unless the epi reacts with tertiary amine polyamidoamine prepolymer, it converts to DCP or CPD. Specifically, epi reacts with chloride ion to form DCP, and with water to form CPD.

The amount of epichlorohydrin byproduct in the tertiary amine polyamidoamine-epichlorohydrin polymer product of the invention is accordingly minimized by maximizing the proportion of the epichlorohydrin which is reacted with tertiary amine. In this regard, reaction of epichlorohydrin with tertiary amine, in acid medium, produces quaternary aminochlorohydrin. Thusly reacted epichlorohydrin is accordingly not available for the indicated undesired reactions with chloride ion and water to form DCP's and CPD, respectively.

Whatever other factors may assist in reaching the desired result of minimizing epichlorohydrin byproduct, it is indispensable that there be insufficient epihalohydrin to convert all tertiary amine groups to quaternary ammonium groups, and likewise that there be sufficient tertiary amine to react with all of the epi—because, as indicated, epi which lacks an available tertiary amine polyamidoamine epichlorohydrin reactive site converts to DCP or CPD. A molar excess of tertiary amine over epi enables other factors which facilitate epi byproduct reduction—e.g, optimal pH and temperature ranges, use of nonhalide acid—to take effect.

However, there must also be enough epichlorohydrin present, relative to tertiary amine, so as to provide sufficient quaternary aminochlorohydrin functionality for achieving desirable levels of wet strengthening effectiveness. This is the reason that the epi:amine molar ratio, in the process of the invention, is preferably at least about 0.7:1.0.

With respect to pH range, the pH of the reaction is maintained at less than about 9.0 for the purpose of keeping the tertiary amine epichlorohydrin adduct more in the quaternary aminochlorohydrin form, and therefore correspondingly less in the quaternary aminomethyloxirane form. In this regard, the tertiary amine epichlorohydrin adduct is in acid/base equilibrium between the quaternary aminochlorohydrin form and the quaternary aminomethyloxirane form; in the equilibrium reaction, the quaternary aminochlorohydrin reacts with $OH^-$ to give quaternary aminomethyloxirane and $Cl^-$, while conversely the quaternary aminomethyloxirane and $Cl^-$ react with $H^+$ to give quaternary aminochlorohydrin.

As can be seen, where the adduct is in the quaternary aminomethyloxirane form, the chloride ion is available for reaction with epi to form DCP. However, where the adduct is in the quaternary aminochlorohydrin form, the chloride ion is bonded to carbon, and therefore not available for the undesired reaction with epi.

It is noted herein that the DCP's are toxic. Therefore, lowering the amount of chloride ion present in the reaction mixture, where epichlorohydrin is also present, is of special importance.

The pH of the reaction is accordingly lowered, in order to shift the indicated equilibrium reaction toward quaternary aminochlorohydrin, and away from quaternary aminomethyloxirane and chloride ion, and thereby lessen the availability of chloride ion for reaction with epi to form DCP. Specifically, where the pH is below 9.0, the quaternary aminochlorohydrin is less than 50% dehydrohalogenated by base to quaternary aminomethyloxirane and chloride ion at equilibrium.

However, the pH of the epi and prepolymer reaction mixture also must not be too low, because of the acid/base equilibrium reaction of the prepolymer tertiary amine groups. In this regard, there is an acid/base equilibrium between the tertiary amine form and the protonated tertiary amine form. In the equilibrium reaction, the tertiary amine reacts with $H^+$ to give the protonated tertiary amine, while conversely the protonated tertiary amine reacts with $OH^-$ to give the tertiary amine.

To the extent that the tertiary amine form has been protonated to the quaternary form, it is unavailable for reaction with epichlorohydrin. It is to this extent which the epichlorohydrin is correspondingly left unreacted; as discussed herein, epichlorohydrin which is left unreacted remains available for the indicated undesired reactions: i.e., with water to form CPD, and with chloride ion to form DCP. Accordingly, the more of the tertiary amine that is converted to the protonated quaternary form, the more epichlorohydrin is available for the undesired reactions, and so the higher will be the level of epichlorohydrin byproducts formed in the reaction of epichlorohydrin and prepolymer.

And further, to the extent that the tertiary amine form has been protonated to the quaternary form, it is likewise unavailable for the reaction with quaternary aminomethyloxirane. It is this reaction which provides the crosslinking between prepolymer chains, with the 2-hydroxypropyl moiety connecting quaternary amine sites.

Thus, the pH is not rendered too low, so as to have too great a preponderance of $H^+$ over $OH^-$ and therefore shift the equilibrium too much from tertiary amine to protonated quaternary amine. Specifically, the pH of the reaction is about 7.5 or higher.

As a matter of particular preference the pH of the reaction mixture for the epichlorohydrin and prepolymer is in the range of about 8.0 to about 8.5. The reason for the preferred 8.5 pH upper limit pertains to the acid/base equilibrium of the tertiary amine epichlorohydrin adduct, while the reason for the preferred 8.0 pH lower limit pertains to the acid/base equilibrium between tertiary amine and protonated quaternary amine—both of these acid/base equilibria being discussed herein.

In this regard, where the pH is above 8.5, there is a significant equilibrium shift from quaternary aminochlorohydrin to quaternary aminomethyloxirane and chloride ion. As discussed, the presence of chloride ion is particularly disadvantageous where there also is unreacted epichlorohydrin, because the chloride ion and epi react to form the particularly toxic DCP's. Accordingly, keeping the pH at less than about 8.5, and thereby significantly lowering the concentration of chloride ion, is of crucial importance. Further, where the pH is below 8.0, there is a significant equilibrium shift from the tertiary amine form to the protonated tertiary amine form. This shift, also as discussed, both increases DCP and CPD levels and also lowers crosslinking. Accordingly, keeping the pH of the epi and prepolymer reaction between about 8.0 and about 8.5 provides further significant advantages—with respect both to reducing epichlorohydrin byproducts and to optimizing crosslinking.

During the reaction of epichlorohydrin and prepolymer, pH can be maintained in the requisite range by the addition of acid and/or base, when needed and in the amount or amounts needed. Bases which may be used include sodium hydroxide and potassium hydroxide. Suitable acids, as discussed herein, include nitric acid, sulfuric acid, and phosphoric acid.

Conducting the reaction of epichlorohydrin and prepolymer in the presence of an acid—specifically, including acid in the reaction mixture—is necessary in order to meet the requirement of keeping the pH within the indicated upper limit. In this regard, the reaction of epichlorohydrin with the prepolymer consumes weak base and generates strong base at the same molar rate—i.e., for each mole of weak base consumed, a mole of strong base is generated. As a result, acid must be employed to bring the pH down, and accordingly to shift the equilibrium of the tertiary amine epichlorohydrin adduct—as discussed herein—toward quaternary aminochlorohydrin, and away from quaternary aminomethyloxirane and chloride ion.

Addition of base is necessary when the rate of the crosslinking reaction exceeds the rate of the reaction of tertiary amine with epi. The crosslinking reaction consumes a mole of weak base and causes the pH to fall. When the pH is too low, tertiary amines are protonated to such an extent that the reaction of epi with amine and the crosslinking reaction slow down. The result of these reactions slowing down is that aminochlorohydrin is not formed, epi is converted to CPD, aminochlorohydrin functionality of the product is reduced, and paper wet strengthening effectiveness is decreased.

Conducting the epichlorohydrin and prepolymer reaction in the presence specifically of one or more nonhalide acids provides the indicated advantages of employing an acid, with the added benefit of further lowering halide—e.g., chloride—ion concentration. Conversion of epi to epihalohydrin byproducts is accordingly additionally reduced. Suitable nonhalide acids include nitric acid, sulfuric acid, and phosphoric acid.

As a matter of preference, the reaction of epihalohydrin and prepolymer, besides being conducted in the presence of a nonhalide acid, is further conducted in the absence, or the substantial absence, of halide acid. In this regard, avoiding the addition of harmful halide to the epihalohydrin system is of particular importance, in order to minimize the amount of halide ion available in the presence of epihalohydrin. Considering the especial undesirability of halide ion being together with the epihalohydrin, because they form the particularly toxic DHP's, a halide acid is so rich a source of halide ion as to be especially undesirable for employment in the process of the invention.

Reacting the epihalohydrin and prepolymer at a temperature of about 35° C. or less may also help to reduce the halide ion concentration in the reaction mixture, and accordingly lower the amount of epihalohydrin byproducts which are produced. Specifically, operating in the stated temperature range may shift the equilibrium of the tertiary amine epihalohydrin adduct toward the quaternary aminochlorohydrin form, and thereby may reduce halide ion concentration.

Additionally, conducting the epihalohydrin and prepolymer reaction at about 35° C. or less lowers the rate of the reaction of tertiary amine with quaternary aminomethyloxirane; as indicated herein, this is the crosslinking reaction. The crosslinking reaction may increase halide ion concentration by withdrawing quaternary aminomethyloxirane from the indicated equilibrium of quaternary aminochlorohydrin with quaternary aminomethyloxirane and chloride ion. Accordingly, decreasing the rate of the crosslinking reaction may lower the halide ion concentration in the reaction mixture. As discussed herein, decreasing the halide ion concentration leads to more favorable partitioning of the epihalohydrin between the desired reaction with tertiary amine and the undesired reaction with halide ion.

In any event, lowering the rate of the crosslinking reaction is indeed advantageous in that it allows more control to be exerted over the process. The process of the invention is characterized by a high rate of crosslinking because of the low epi:amine molar ratio.

Specifically, for crosslinking to occur, there must be both quaternary aminomethyloxirane groups, and also tertiary amine groups unreacted with epihalohydrin. Because of the low epi:amine molar ratio, a comparatively greater amount of tertiary amine remains unreacted with epihalohydrin, and therefore free to participate in the crosslinking reaction with quaternary aminomethyloxirane. The rate of crosslinking is thusly increased. In contrast, processes known in the art generally employ an excess of epihalohydrin. Accordingly, in these processes the crosslinking rate is low, because the amount of free tertiary amine groups, unreacted with epihalohydrin and therefore available for the crosslinking reaction, is reduced.

However, in the process of the present invention the reaction of tertiary amine and epihalohydrin is unmanageable if the temperature is too great; the crosslinking occurs at too high a rate of speed, and the result will be a gelled or solid product. If the viscosity increases too fast, it cannot be effectively monitored and reaction may not be stopped at the right point.

Accordingly, the prepolymer and epi are reacted at a temperature sufficiently low to permit termination of this reaction prior to gelation of the polymer. Specifically, the reaction temperature is kept low enough to hold the crosslinking reaction down at a manageable rate, so that the reaction can indeed be stopped when the correct degree of crosslinking has been effected, or otherwise at the proper time.

Preferably, to achieve these objectives the reaction of epihalohydrin and prepolymer is conducted at a temperature of about 35° C. or less. As a matter of particular preference, this reaction is conducted at a temperature of about 20° C. to about 35° C.

The reaction of epihalohydrin and prepolymer is preferably terminated by adding a sufficient amount of acid to convert all, or at least substantially all, of the epoxide groups to chlorohydrin groups—i.e., to completely shift the equilibrium from oxirane and chloride ion to aminochlorohydrin This terminates crosslinking, because it leaves no oxirane for reaction with the tertiary amine.

The indicated conversion of oxirane allows the tertiary amine polyamidoamine-epihalohydrin polymer of the invention to be stored. If there is remaining oxirane, crosslinking will continue during storage, viscosity will increase, and gelling and/or solidification may result.

As a matter of particular preference, sufficient acid is added, to the epihalohydrin and prepolymer reaction mixture, to lower the pH to at least about 2.0.

This acid employed for terminating the epi and prepolymer reaction may comprise one or more halide acids. However, if halide acid is used, it will convert any remaining epichlorohydrin to DCP's. On the other hand, if nonhalide acid is used in this termination of the reaction, more epichlorohydrin is converted to CPD rather than to DCP's.

Accordingly, it is preferred that the acid used for terminating the reaction comprise one or more nonhalide acids. Nonhalide acids suitable for this purpose include nitric acid, sulfuric acid, and phosphoric acid. As a matter of particular preference, halide acids are absent, or substantially absent, from this termination of the epi and prepolymer reaction.

The tertiary amine polyamidoamine-epihalohydrin polymers of the invention are suitable for treatment of, addition to, and incorporation with cellulosic and fibrous materials, especially cellulosic and fibrous webs and pulps, and most especially paper pulps and paper. The tertiary amine polyamidoamine-epihalohydrin polymers produced by the process of the invention have particular utility as wet strength agents and dry strength agents for cellulosic and fibrous materials, especially cellulosic and fibrous webs and pulps, and most especially paper pulps and paper. Particularly with respect to the indicated paper, this includes heavier paper materials such as paper board, as well as lighter paper materials such as facial tissue, bathroom tissue, paper towels, and paper napkins.

Further as to appropriate uses for the polymers provided by the process of the invention, these polymers, as discussed herein, are characterized by low epihalohydrin byproduct levels. With environmental concerns being of increasing importance, this low epihalohydrin byproduct content is correspondingly of growing significance. For instance, this is true particularly in western Europe, where countries are enacting ever more rigorous environmental restrictions, and especially in Germany, which has very stringent laws pertaining to permissible levels of different materials that are classified as harmful.

As to the foregoing, the paper Eurocurrency which is being newly instituted will be required to comply with the harmful matter content limitations enforced by the different relevant countries. For this reason, the polyamidoamine-epihalohydrin polymers of the present invention, characterized by particularly low epihalohydrin byproduct levels, are particularly suitable as additives for paper Eurocurrency.

Tertiary amine polyamidoamine-epihalohydrin polymers produced by the process of the invention may be activated by conversion of quaternary aminohalohydrin groups to quaternary aminomethyloxirane groups. This conversion may be effected by addition of base in a molar amount equal to, or at least equal to, the sum of free acid, protonated amine, and halohydrin groups. For complete activation, the pH of the polymer should be above 9.5 15 minutes after addition of the base. Suitable bases for polymer activation include alkali metal hydroxides, alkali metal carbonates, calcium hydroxide, and quaternary ammonium hydroxides.

The invention further pertains to compositions—including aqueous compositions—comprising the tertiary amine polyamidoamine-epihalohydrin polymers obtained from the process of the invention. Compositions comprising the polyamidoamine-epihalohydrin polymers of the invention are suitable for treatment of, addition to, and incorporation with cellulosic and fibrous materials, especially cellulosic and fibrous webs and pulps, and most especially paper pulps and paper. Compositions of the invention—e.g., aqueous solutions of the tertiary amine polyamidoamine-epihalohydrin polymers of the invention—preferably comprise amounts of the polymer which are effective for the intended use.

Particularly, compositions of the invention, and most particularly aqueous solutions of the polyamidoamine-epihalohydrin polymers of the invention, are suitable as wet strength and dry strength compositions—e.g., for cellulosic and fibrous materials, especially cellulosic and fibrous webs and pulps, and most especially paper pulps and paper. These compositions comprise amounts of the polymer effective for the intended (e.g., wet or dry strength) function.

Suitable aqueous solutions of the invention include those having concentrations of about 1–60% by weight polymer. For wet strength and dry strength applications, solution concentrations of about 1–40% by weight polymer are preferred; concentrations of about 5–35% are more preferred, while the most preferred concentrations are about 10–30%.

The invention also pertains to cellulosic and fibrous materials, especially cellulosic and fibrous webs and pulps, and most especially paper pulps and paper, comprising the tertiary amine polyamidoamine-epihalohydrin polymers of the invention. These materials preferably incorporate amounts of the polymer effective for the intended function.

When employed as wet and dry strength agents, the polymers of the invention are preferably present in amounts of about 0.1–5% by weight polymer, based on the dry weight of the cellulosic material. The quantity of polymer present depends upon the degree of wet and/or dry strength desired in the finished product, and on the amount of polymer retained by the cellulosic fibers.

Compositions and polymers of the invention can be employed as wet strength agents according to the standard methods as these are known in the art. Particularly for wet strength applications, the agents are typically added to the pulp furnish any time before the sheet is formed.

The invention additionally pertains to the making of paper by a process which includes addition of the tertiary amine polyamidoamine-epichlorohydrin polymer to provide wet strength to the paper. This process can include the steps of providing a paper pulp, adding the polymer of the invention to the pulp, forming a sheet from the paper pulp after addition of the polymer, and drying the sheet to form paper.

Polymers of the invention accordingly can be employed particularly as paper strength additives by incorporation with paper pulp fiber in the paper machine. Preferably, the polymer is incorporated into the paper pulp in amounts of about 0.1–5%, based on dry weight of the polymer versus dry weight of the pulp. Good strength results are provided at polymer levels within this range.

Further, the invention pertains to a process of repulping paper. This process can include the steps of providing paper which comprises the polymer of the invention, and forming a slurry comprising water and pulp prepared from the indicated paper. The invention further pertains to the process of making paper from pulp prepared according to the foregoing repulping process, and to paper made from this pulp.

In fact, the polymers of the invention are particularly advantageous for wet strength applications where repulpability is desired. In contrast to paper made with polymers prepared from poly(methyldiallylamine) (PMDAA) prepolymers, the broke, or scrap, of paper made with the polymers of the present invention is easily repulpable, due to the chemical structure of the polyamidoamine (PAA) prepolymers of the invention. Specifically, the reason for this easy repulpability is that, in contrast to PMDAA prepolymers, the PAA prepolymers of the invention contain base-hydrolyzable amide linkages.

The invention is illustrated by the following Procedures and Examples; these are provided for the purpose of representation, and are not to be construed as limiting the scope of the invention. Reduced Specific Viscosity is measured at 25° C. in 1.0M NH$_4$Cl at a concentration of 2.00 g/dL. Unless stated otherwise, all percentages, parts, etc. are by weight.

SYNTHESIS OF THE PREPOLYMERS

Prepolymer A—Oxalic Acid:Urea 60:40 Molar Ratio Copolymer with MBAPA

Water (73.0 g) was added to MBAPA (2.00 mol, 290.6 g), and stirring was effected in a 1-l resin kettle. The temperature of this mixture rose from 24° C. to 49° C. After cooling to 26° C., oxalic acid (1.20 mol, 108.1 g) was added over 40 minutes, with the temperature rising to 76° C.

The reaction mixture was then heated to 120° C. in 45 minutes, at which point distillation began. The reaction mixture was heated to 180° C. in 3 hours, and held at 180° C. for 2.5 hours.

The temperature was lowered to 169° C., and then urea (0.80 mol, 48.2 g) was added over 30 minutes. Ammonia evolving from the reaction of the urea was trapped in a 10% sulfuric acid scrubber. The temperature was then raised to 190° C. in 15 minutes, and held there for 1.5 hours. The reaction mixture was cooled to 130–150° C., hot water (931 g) was added, and stirring was conducted overnight.

After the overnight stirring, sulfuric acid (98%, 102.1 g) was added, and prepolymer product was rinsed from the reactor with water (97 g). This product had a pH of 6.0, a total solids content of 31.5% (measured from comparative weighing, before and after oven drying of the product), an organic solids (OS) content of 25.0% (calculated as weights of starting materials minus weights of condensation volatiles divided by total final product weight), a reduced specific viscosity (RSV) of 0.239 dL/g (calculated on the basis of organic solids), and an amine content of 1.33 meq/wet g (calculated as moles of MBAPA divided by total final product weight).

Prepolymers B-L

These prepolymers were prepared according to the Prepolymer A procedure as discussed above, but with the components, proportions, process conditions, and product properties as set forth in Table 1.

TABLE 1

| PAA prepolymer | B | C | D | E | F |
|---|---|---|---|---|---|
| MBAPA (g) | 290.33 | 290.44 | 290.36 | 290.58 | 290.67 |
| Water (g) | 73.16 | 73.08 | 73.02 | 73.07 | 73.08 |
| Adipic acid (g) | 0.00 | 0.00 | 0.00 | 0.00 | 116.81 |
| Oxalic acid (g) | 108.02 | 108.14 | 72.18 | 100.82 | 0.00 |
| Urea (g) | 47.94 | 48.09 | 72.13 | 72.07 | 72.01 |
| Mineral acid | H2SO4 | H2SO4 | H2SO4 | H2SO4 | H2SO4 |
| Mineral acid (g) | 104.09 | 78.58 | 101.85 | 88.93 | 98.52 |
| Dilution water (g) | 277.5 | 1028.0 | 996.1 | 994.8 | 1129.6 |
| pH | 4.4 | 8.5 | 6.0 | 6.0 | 6.0 |
| RSV | 0.264 | 0.267 | 0.316 | 0.226 | 0.211 |
| Total solids (%) | 64.5 | 30.4 | 32.2 | 31.6 | 30.8 |
| Organic solids (%) | 49.6 | 25.4 | 24.9 | 26.7 | 25.0 |
| Amine (meq/g) | 2.64 | 1.35 | 1.37 | 1.36 | 1.22 |

| PAA prepolymer | G | H | I | J | K | L |
|---|---|---|---|---|---|---|
| MBAPA (g) | 290.60 | 290.56 | 290.50 | 303.11 | 302.81 | 302.23 |
| Water (g) | 73.17 | 73.14 | 0.00 | 73.33 | 73.08 | 73.55 |
| Adipic acid (g) | 175.37 | 233.89 | 0.00 | 0.00 | 0.00 | 0.00 |
| Oxalic acid (g) | 0.00 | 0.00 | 0.00 | 108.36 | 108.09 | 108.07 |
| Urea (g) | 48.06 | 24.23 | 120.14 | 48.50 | 48.49 | 48.54 |
| Mineral acid | H2SO4 | H2SO4 | H2SO4 | H2SO4 | None | None |
| Mineral acid (g) | 83.93 | 94.16 | 99.87 | 111.15 | — | — |
| Dilution water (g) | 1230.3 | 1331.0 | 1027.1 | 1460.9 | 1217.3 | 720.7 |
| pH | 6.0 | 6.0 | 8.0 | 6.0 | — | — |
| RSV | 0.210 | 0.200 | 0.233 | 0.216 | 0.218 | 0.217 |
| Total solids (%) | 30.5 | 29.9 | 30.2 | 25.0 | 24.2 | 35.0 |
| Organic solids (%) | 25.2 | 25.1 | 23.3 | 19.8 | 24.2 | 35.0 |
| Amine (meq/g) | 1.14 | 1.05 | 1.36 | 1.07 | 1.29 | 1.86 |

Prepolymers M–R

Each of these prepolymers was prepared from an amount of solid polymer synthesized from MBAPA and a 60:40 molar ratio of oxalic acid and urea, and diluted with water. Certain of the prepolymers were acidified with hydrochloric acid and others were not. Acidification and other prepolymer properties are indicated in Table 2.

TABLE 2

| PAA prepolymer | M | N | O | P | Q | R |
|---|---|---|---|---|---|---|
| Mineral acid | HCl | HCl | HCl | HCl | None | None |
| pH | 6.0 | 6.0 | 6.0 | 6.0 | — | — |
| RSV | 0.171 | 0.180 | 0.200 | 0.190 | 0.205 | 0.146 |
| Total solids (%) | 25.8 | 25.0 | 30.6 | 31.3 | 25.7 | 24.6 |
| Organic solids (%) | 21.8 | 21.4 | 25.9 | 26.5 | 21.8 | 20.8 |
| Amine (meq/g) | 1.16 | 1.14 | 1.38 | 1.41 | 1.16 | 1.11 |

SYNTHESIS OF THE POLYMERS

EXAMPLE 1

The pH of an amount of Prepolymer A (Copoly(MBAPA, 60:40 oxalic acid:urea molar ratio), RSV 0.239 dL/g, 25.0% organic solids, 1.33 meq/g amine, pH 6.0, 0.266 mol amine, 200.0 g) was increased to 8.0 with sodium hydroxide (6.0 mol/l, 6.55 g). Epichlorohydrin (0.239 mol, 22.11 g) was added over 20 minutes to this reaction mixture stirred at 25° C., with the pH being maintained at 8.0 by the addition of sulfuric acid (98%, 1.24 g). The molar ratio of epichlorohydrin to amine (Molar Epi:Amine) was 0.90. Reaction OS content was 30.0% (calculated as the weight of prepolymer organic solids plus the weight of epichlorohydrin divided by the weight of the reaction mixture).

The reaction mixture was heated to 30° C. in 20 minutes and was stirred at 30° C. for 11 hours, with the pH being kept between 7.9 and 8.1 by the addition of sodium hydroxide (6.0 mol/l, 10.40 g). During this period, Gardner-Holdt viscosity measurements were taken of reaction mixture samples at 25° C. At 11 hours of reaction time, viscosity had increased to <L; crosslinking was then stopped by adding enough hydrochloric acid (38%, 3.76 g) to decrease the pH to 2. To stabilize the polymer against increase of viscosity during storage, the product was heated for 3.5 hours at 70° C., with the pH being maintained at 2 by the addition of hydrochloric acid (38%, 6.64 g).

The final product was determined to have a total solids content of 28.4%, an OS content of 22.4%, a pH of 1.8, a Brookfield viscosity at 25° C. of 68 cP, and 1,3-dichloro-2-propanol (DCP) in the amount of 3381 wet ppm or 15105 dry OS ppm. After activation with base, incorporating 1% polymer into paper and curing the paper as discussed immediately hereinafter, the ratio of wet tensile strength to dry tensile strength (Cured Wet/Dry Tensile) was measured at 18.2%.

Titration for Acid Content and Activation with Base

The amount of base required to convert chlorohydrin groups to epoxide groups is approximately equal to the net amount of acid added in preparing the polymer. Alternatively, it can be measured by pH titration of polymer with the base.

For pH titration, standardized 1 N sodium hydroxide was added in ca. 5% increments at five minute intervals to polymer with a 10% solids content. The equivalence point was taken to be at a pH about 10.8, which is the most steeply rising point of the pH vs. added base curve occurring after the pH 9.5–10.0 plateau. Polymer diluted to a 3% solids content was activated before addition to paper pulp by adding the amount of sodium hydroxide required to convert chlorohydrin groups to epoxide groups.

Papermaking

The pulp was a 70:30 by weight mixture of Crown Vantage Burgess hardwood and Rayonier bleached kraft pulp. This pulp was diluted with water having 50 ppm hardness and 25 ppm alkalinity.

The pulp was beaten to a Canadian Standard freeness of 420 cc on a Jones 12 inch double disk refiner, and its pH was adjusted to 7.5 with sodium hydroxide. Activated polymer in an amount of 1%, based on the dry weight of pulp, was added thereto. The pulp was sheeted on a continuous lab former to provide paper with a basis weight of approximately 40 lbs/ream (the ream being 3000 sq.ft).

The paper was wet pressed at 45 psig and then dried to a moisture content of 4.5–5.0%, on seven drying cylinders having surface temperatures of 77° C. The paper was cured in an oven at 80° C. for 30 minutes. Sheets tested for wet strength were soaked for two hours in distilled water. Wet strength is expressed as a percentage of dry strength.

EXAMPLES 2–19

The polymers of Examples 2–19 were prepared according to the Example 1 procedure, but with the components, proportions, process conditions, and product properties as set forth in Table 3.

TABLE 3

| Example | 2 | 3 | 4 | 5 | 6 |
|---|---|---|---|---|---|
| PAA prepolymer | C | C | C | C | B |
| PAA acyl precursors(molar ratio) | 60:40Ox[1]:Ur[2] | 60:40 Ox:Ur | 60:40 Ox:Ur | 60:40 Ox:Ur | 60:40 Ox:Ur |
| PAA (g) | 200.05 | 200.03 | 200.04 | 200.05 | 100.86 |
| PAA OS (g) | 50.75 | 50.74 | 50.74 | 50.75 | 50.05 |
| PAA amine (moles) | 0.270 | 0.270 | 0.270 | 0.270 | 0.266 |
| Epichlorohydrin (g) | 24.66 | 22.16 | 22.13 | 22.17 | 22.13 |
| Epichlorohydrin (moles) | 0.267 | 0.239 | 0.239 | 0.240 | 0.239 |
| Molar Epi:Amine ratio | 0.99 | 0.89 | 0.89 | 0.89 | 0.90 |
| Reaction conc HCl (g) | 0.00 | 0.00 | 0.00 | 0.00 | 0.00 |
| Reaction conc H2SO4 (g) | 1.39 | 2.05 | 1.47 | 1.73 | 3.20 |
| Reaction 6N NaOH (g) | 15.60 | 18.53 | 21.23 | 9.83 | 27.54 |
| Reaction time (hr) | 6.05 | 5.15 | 4.02 | 7.25 | 11.95 |
| Reaction temp (degC) | 29 | 30 | 29 | 29 | 30 |
| Reaction pH | 8.4 | 8.5 | 8.6 | 8.0 | 8.0 |
| Reaction OS (%) | 31.2 | 30.0 | 29.8 | 31.2 | 47.0 |
| Dilution water (g) | 0.00 | 0.00 | 66.46 | 67.23 | 165.68 |
| Quench conc HCl (g) | 12.23 | 9.01 | 17.25 | 10.98 | 12.03 |
| Product (g) | 627.03 | 607.98 | 328.58 | 311.99 | 331.44 |
| Product total solids (%) | 13.5 | 14.4 | 28.5 | 28.4 | 29.3 |
| Product OS (%) | 11.70 | 11.70 | 21.93 | 23.12 | 21.32 |
| Product DCP[3] (dry OS ppm) | 19571 | 16561 | 17689 | 14024 | 13200 |
| Product CPD (dry OS ppm) | 9547 | 8493 | 6900 | 7988 | 8486 |
| Product viscosity (cP) | 16 | 20 | 95 | 75 | 178 |
| Product pH | 2.02 | 1.98 | 1.89 | 1.86 | 1.87 |
| Cured Wet/Dry Tensile (%) | 21.0 | 23.1 | 22.7 | 20.3 | 21.9 |
| Example | 7 | 8 | 9 | 10 | 11 |
| PAA prepolymer | B | A | A | D | E |
| PAA acyl precursors | 60:40 Ox:Ur | 60:40 Ox:Ur | 60:40 Ox:Ur | 40:60 Ox:Ur | 40:60 Ox:Ur |
| PAA (g) | 473.46 | 200.02 | 200.03 | 200.06 | 192.84 |
| PAA OS (g) | 234.94 | 49.96 | 49.97 | 49.90 | 51.40 |
| PAA amine (moles) | 1.251 | 0.266 | 0.266 | 0.274 | 0.261 |

TABLE 3-continued

| | | | | | |
|---|---|---|---|---|---|
| Epichlorohydrin (g) | 104.13 | 22.11 | 19.69 | 19.66 | 19.74 |
| Epichlorohydrin (moles) | 1.125 | 0.239 | 0.213 | 0.212 | 0.213 |
| Molar Epi:Amine ratio | 0.90 | 0.90 | 0.80 | 0.78 | 0.82 |
| Reaction conc HCl (g) | 0.00 | 0.00 | 0.00 | 0.00 | 0.00 |
| Reaction conc H2SO4 (g) | 0.81 | 0.69 | 0.32 | 1.19 | 0.00 |
| Reaction 6N NaOH (g) | 90.33 | 10.92 | 17.55 | 12.64 | 15.20 |
| Reaction time (hr) | 5.47 | 21.67 | 9.30 | 9.15 | 9.28 |
| Reaction temp (degC) | 30 | 29 | 30 | 30 | 30 |
| Reaction pH | 8.0 | 7.5 | 8.1 | 8.0 | 8.0 |
| Reaction OS (%) | 29.9 | 30.8 | 29.3 | 29.8 | 31.2 |
| Dilution water (g) | 465.88 | 67.06 | 59.20 | 57.07 | 50.25 |
| Quench conc HCl (g) | 52.47 | 9.33 | 8.72 | 9.21 | 9.38 |
| Product (g) | 1189.02 | 310.13 | 305.51 | 299.83 | 287.41 |
| Product total solids (%) | 36.5 | 28.6 | 29.5 | 29.1 | 29.9 |
| Product OS (%) | 27.64 | 22.92 | 22.44 | 22.43 | 24.41 |
| Product DCP (dry OS ppm) | 23965 | 13324 | 8529 | 19233 | 8209 |
| Product CPD (dry OS ppm) | 7831 | 15304 | 7631 | 15207 | 5775 |
| Product viscosity (cP) | 243 | 62 | 79 | 76 | 79 |
| Product pH | 2.06 | 1.78 | 1.86 | 1.84 | 1.99 |
| Cured Wet/Dry Tensile (%) | — | 19.8 | 18.3 | 19.6 | 20.4 |
| Example | 12 | 13 | 14 | 15 | 16 |
| PAA prepolymer | F | F | G | G | H |
| PAA acyl precursors | 40:60 Ad[4]:Ur | 40:60 Ad:Ur | 60:40 Ad:Ur | 60:40 Ad:Ur | 80:20 Ad:Ur |
| PAA (g) | 233.36 | 227.43 | 198.55 | 233.97 | 253.34 |
| PAA OS (g) | 58.39 | 56.91 | 50.10 | 59.04 | 63.56 |
| PAA amine (moles) | 0.285 | 0.278 | 0.226 | 0.267 | 0.267 |
| Epichlorohydrin (g) | 24.65 | 19.69 | 19.72 | 22.27 | 22.10 |
| Epichlorohydrin (moles) | 0.266 | 0.213 | 0.213 | 0.241 | 0.239 |
| Molar Epi:Amine ratio | 0.93 | 0.77 | 0.94 | 0.90 | 0.90 |
| Reaction conc HCl (g) | 0.00 | 0.00 | 0.00 | 0.00 | 0.00 |
| Reaction conc H2SO4 (g) | 0.00 | 0.00 | 0.46 | 0.54 | 0.00 |
| Reaction 6N NaOH (g) | 27.69 | 17.68 | 15.62 | 25.57 | 28.79 |
| Reaction time (hr) | 5.83 | 10.22 | 16.83 | 6.18 | 5.88 |
| Reaction temp (degC) | 32 | 34 | 30 | 30 | 33 |
| Reaction pH | 8.5 | 8.0 | 8.0 | 8.5 | 8.5 |
| Reaction OS (%) | 29.1 | 28.9 | 29.8 | 28.8 | 28.2 |
| Dilution water (g) | 50.84 | 50.14 | 56.57 | 50.12 | 50.31 |
| Quench conc HCl (g) | 20.01 | 12.03 | 9.54 | 18.08 | 19.05 |
| Product (g) | 356.55 | 326.97 | 300.46 | 350.55 | 373.59 |
| Product total solids (%) | 29.8 | 29.2 | 27.5 | 28.9 | 29.0 |
| Product OS (%) | 22.67 | 23.06 | 22.79 | 22.70 | 22.49 |
| Product DCP (dry OS ppm) | 20398 | 8212 | 10328 | 14645 | 14204 |
| Product CPD (dry OS ppm) | 7079 | 7600 | 9313 | 7345 | 5494 |
| Product viscosity (cP) | 140 | 115 | 75 | 114 | 112 |
| Product pH | 1.94 | 1.96 | 1.98 | 1.97 | 1.97 |
| Cured Wet/Dry Tensile (%) | 22.3 | 19.0 | 21.0 | 21.2 | 21.6 |
| Example | 17 | 18 | 19 | | |
| PAA prepolymer | I | I | I | | |
| PAA acyl precursors | Urea | Urea | Urea | | |
| PAA (g) | 195.62 | 195.63 | 195.78 | | |
| PAA OS (g) | 45.60 | 45.60 | 45.63 | | |
| PAA amine (moles) | 0.266 | 0.267 | 0.267 | | |
| Epichlorohydrin (g) | 22.19 | 19.69 | 19.73 | | |
| Epichlorohydrin (moles) | 0.240 | 0.213 | 0.213 | | |
| Molar Epi:Amine ratio | 0.90 | 0.80 | 0.80 | | |
| Reaction conc HCl (g) | 0.00 | 0.00 | 0.00 | | |
| Reaction conc H2SO4 (g) | 0.00 | 0.00 | 0.00 | | |
| Reaction 6N NaOH (g) | 15.14 | 7.99 | 13.06 | | |
| Reaction time (hr) | 4.68 | 3.57 | 9.65 | | |
| Reaction temp (degC) | 30 | 30 | 33 | | |
| Reaction pH | 8.6 | 8.5 | 8.0 | | |
| Reaction OS (%) | 29.1 | 29.2 | 28.6 | | |
| Dilution water (g) | 49.98 | 50.2 | 50.2 | | |
| Quench conc HCl (g) | 13.99 | 3.59 | 9.73 | | |
| Product (g) | 296.92 | 277.10 | 288.50 | | |
| Product total solids (%) | 29.3 | 28.9 | 28.7 | | |
| Product OS (%) | 22.12 | 23.26 | 22.20 | | |
| Product DCP (dry OS ppm) | 22397 | 7926 | 10646 | | |
| Product CPD (dry OS ppm) | 9839 | 4894 | 9785 | | |
| Product viscosity (cP) | 98 | 95 | 98 | | |
| Product pH | 1.93 | 1.97 | 1.93 | | |
| Cured Wet/Dry Tensile (%) | 20.8 | 21.0 | 19.3 | | |

COMPARATIVE EXAMPLES 20–46

The polymers of Comparative Examples 20–46 also were prepared according to the Example 1 procedure, but with the components, proportions, process conditions, and product properties as set forth in Table 4.

TABLE 4

| Example | 20 | 21 | 22 | 23 | 24 |
|---|---|---|---|---|---|
| PAA prepolymer | Q | Q | Q | R | K |
| PAA acyl precursors(molar ratio) | 60:40 Ox[1]:Ur[2] | 60:40 Ox:Ur | 60:40 Ox:Ur | 60:40 Ox:Ur | 60:40 Ox:Ur |
| PAA (g) | 197.72 | 200.04 | 197.73 | 200.05 | 200.08 |
| PAA OS (g) | 43.06 | 43.57 | 43.06 | 41.71 | 48.42 |
| PAA amine (moles) | 0.229 | 0.232 | 0.229 | 0.222 | 0.257 |
| Epichlorohydrin (g) | 32.58 | 32.52 | 32.48 | 29.48 | 32.54 |
| Epichlorohydrin (moles) | 0.352 | 0.351 | 0.351 | 0.319 | 0.352 |
| Molar Epi:Amine ratio | 1.54 | 1.52 | 1.53 | 1.44 | 1.37 |
| Reaction conc HCl (g) | 9.01 | 27.71 | 16.16 | 20.85 | 23.95 |
| Reaction conc H2SO4 (g) | 0.00 | 0.00 | 0.00 | 0.00 | 0.00 |
| Reaction 6N NaOH (g) | 0.00 | 26.46 | 0.00 | 17.87 | 17.65 |
| Reaction time (hr) | 1.22 | 13.25 | 5.53 | 5.78 | 7.85 |
| Reaction temp (degC) | 21 | 21 | 21 | 29 | 30 |
| Reaction pH | 9.0 | 8.5 | 8.0 | 8.5 | 8.5 |
| Reaction OS (%) | 31.6 | 17.5 | 30.7 | 26.5 | 29.5 |
| Dilution water (g) | 0.00 | 0.00 | 0.00 | 0.00 | 0.00 |
| Quench conc HCl (g) | — | — | — | — | — |
| Product (g) | 239.31 | 286.73 | 246.37 | 268.25 | 274.22 |
| Product total solids (%) | — | — | — | — | — |
| Product OS (%) | 28.51 | 25.65 | 26.86 | 25.89 | 28.68 |
| Product DCP[3] (dry OS ppm) | 194295 | 93318 | 156431 | 45442 | 53363 |
| Product CPD (dry OS ppm) | 17819 | 12494 | 10078 | 5392 | 5483 |
| Product viscosity (cP) | Gel | Gel | Gel | Gel | Gel |
| Product pH | — | — | — | — | — |
| Cured Wet/Dry Tensile (%) | — | — | — | — | — |
| Example | 25 | 26 | 27 | 28 | 29 |
| PAA prepolymer | L | R | R | R | M |
| PAA acyl precursors | 60:40 Ox:Ur | 60:40 Ox:Ur | 60:40 Ox:Ur | 60:40 Ox:Ur | 60:40 Ox:Ur |
| PAA (g) | 200.08 | 200.05 | 200.04 | 200.05 | 200.07 |
| PAA OS (g) | 70.03 | 41.71 | 41.70 | 41.71 | 43.57 |
| PAA amine (moles) | 0.372 | 0.222 | 0.222 | 0.222 | 0.232 |
| Epichlorohydrin (g) | 44.80 | 27.11 | 24.61 | 24.67 | 24.68 |
| Epichlorohydrin (moles) | 0.484 | 0.293 | 0.266 | 0.267 | 0.267 |
| Molar Epi:Amine ratio | 1.30 | 1.32 | 1.20 | 1.20 | 1.15 |
| Reaction conc HCl (g) | 14.84 | 19.41 | 19.14 | 19.08 | 9.78 |
| Reaction conc H2SO4 (g) | 0.00 | 0.00 | 0.00 | 0.00 | 0.00 |
| Reaction 6N NaOH (g) | 0.00 | 17.40 | 17.21 | 15.74 | 46.78 |
| Reaction time (hr) | 9.75 | 4.70 | 3.95 | 4.22 | 2.33 |
| Reaction temp (degC) | 21 | 29 | 30 | 30 | 30 |
| Reaction pH | 8.9 | 8.5 | 8.6 | 8.5 | 9.0 |
| Reaction OS (%) | 33.8 | 26.1 | 25.4 | 25.6 | 24.3 |
| Dilution water (g) | 0.00 | 0.00 | 212.10 | 225.60 | 351.00 |
| Quench conc HCl (g) | — | — | 7.19 | 6.89 | 7.22 |
| Product (g) | 339.77 | 263.97 | 480.29 | 492.03 | 639.53 |
| Product total solids (%) | — | — | — | — | — |
| Product OS (%) | 31.32 | 25.60 | 13.42 | 13.10 | 9.99 |
| Product DCP (dry OS ppm) | 70175 | 34350 | 27652 | 26593 | 60331 |
| Product CPD (dry OS ppm) | 5968 | 4134 | 3277 | 3219 | 8145 |
| Product viscosity (cP) | Gel | Gel | Gel | Gel | Gel |
| Product pH | — | — | — | — | — |
| Cured Wet/Dry Tensile (%) | — | — | — | — | — |
| Example | 30 | 31 | 32 | 33 | 34 |
| PAA prepolymer | N | N | M | M | M |
| PAA acyl precursors | 60:40 Ox:Ur | 60:40 Ox:Ur | 60:40 Ox:Ur | 60:40 Ox:Ur | 60:40 Ox:Ur |
| PAA (g) | 200.03 | 200.03 | 200.06 | 200.03 | 200.03 |
| PAA OS (g) | 42.73 | 42.73 | 43.57 | 43.56 | 43.56 |
| PAA amine (moles) | 0.227 | 0.227 | 0.232 | 0.232 | 0.232 |
| Epichlorohydrin (g) | 24.65 | 24.66 | 24.68 | 24.59 | 24.63 |
| Epichlorohydrin (moles) | 0.266 | 0.267 | 0.267 | 0.266 | 0.266 |
| Molar Epi:Amine ratio | 1.17 | 1.17 | 1.15 | 1.15 | 1.15 |
| Reaction conc HCl (g) | 3.68 | 5.52 | 7.34 | 10.28 | 4.09 |
| Reaction conc H2SO4 (g) | 0.00 | 0.00 | 0.00 | 0.00 | 0.00 |
| Reaction 6N NaOH (g) | 33.91 | 32.78 | 16.90 | 36.12 | 33.62 |
| Reaction time (hr) | 7.87 | 7.73 | 4.83 | 5.62 | 10.10 |
| Reaction temp (degC) | 30 | 29 | 30 | 30 | 29 |
| Reaction pH | 8.5 | 8.5 | 8.5 | 8.6 | 8.1 |
| Reaction OS (%) | 25.7 | 25.6 | 27.4 | 25.1 | 26.0 |
| Dilution water (g) | 351.02 | 330.16 | 350.61 | 351.07 | 349.92 |
| Quench conc HCl (g) | 14.24 | 14.39 | 5.73 | 18.47 | 2.59 |

TABLE 4-continued

| | | | | | |
|---|---|---|---|---|---|
| Product (g) | 627.53 | 607.54 | 605.32 | 640.56 | 614.88 |
| Product total solids (%) | 13.5 | 13.0 | — | 12.8 | — |
| Product OS (%) | 10.01 | 10.34 | 10.62 | 9.95 | 10.22 |
| Product DCP (dry OS ppm) | 65496 | 64689 | 54922 | 63064 | 79923 |
| Product CPD (dry OS ppm) | 7121 | 8450 | 6700 | 6054 | 5597 |
| Product viscosity (cP) | 38 | 47 | Gel | 40 | Gel |
| Product pH | 2.02 | 2.04 | — | 1.90 | — |
| Cured Wet/Dry Tensile (%) | 23.8 | 22.1 | — | 21.3 | — |
| Example | 35 | 36 | 37 | 38 | 39 |
| PAA prepolymer | O | O | P | P | J |
| PAA acyl precursors | 60:40 Ox:Ur | 60:40 Ox:Ur | 60:40 Ox:Ur | 60:40 Ox:Ur | 60:40 Ox:Ur |
| PAA (g) | 194.52 | 194.54 | 188.68 | 188.68 | 246.32 |
| PAA OS (g) | 50.44 | 50.45 | 50.05 | 50.05 | 48.87 |
| PAA amine (moles) | 0.268 | 0.268 | 0.266 | 0.266 | 0.262 |
| Epichlorohydrin (g) | 22.05 | 22.18 | 22.13 | 22.15 | 24.66 |
| Epichlorohydrin (moles) | 0.238 | 0.240 | 0.239 | 0.239 | 0.267 |
| Molar Epi:Amine ratio | 0.89 | 0.89 | 0.90 | 0.90 | 1.02 |
| Reaction conc HCl (g) | 5.07 | 4.37 | 1.01 | 5.53 | 0.00 |
| Reaction conc H2SO4 (g) | 0.00 | 0.00 | 0.00 | 0.00 | 1.42 |
| Reaction 6N NaOH (g) | 28.05 | 26.14 | 27.13 | 25.45 | 31.65 |
| Reaction time (hr) | 4.45 | 4.15 | 3.77 | 6.38 | 6.02 |
| Reaction temp (degC) | 29 | 29 | 29 | 25 | 30 |
| Reaction pH | 8.6 | 8.6 | 8.5 | 8.6 | 8.6 |
| Reaction OS (%) | 29.0 | 29.4 | 30.2 | 29.9 | 24.2 |
| Dilution water (g) | 360.81 | 71.97 | 78.08 | 77.83 | 418.80 |
| Quench conc HCl (g) | 12.49 | 13.08 | 12.15 | 11.61 | 15.66 |
| Product (g) | 622.99 | 332.28 | 329.18 | 331.25 | 738.51 |
| Product total solids (%) | 14.2 | 26.9 | 24.7 | 26.1 | 13.4 |
| Product OS (%) | 11.15 | 21.37 | 21.50 | 21.34 | 9.70 |
| Product DCP (dry OS ppm) | 40145 | 42276 | 39298 | 41877 | 17497 |
| Product CPD (dry OS ppm) | 3338 | 2800 | 3509 | 2851 | 9011 |
| Product viscosity (cP) | 29 | 101 | 268 | 211 | 35 |
| Product pH | 1.95 | 1.97 | 1.92 | 1.86 | 1.68 |
| Cured Wet/Dry Tensile (%) | 20.7 | 26.8 | 21.4 | 20.5 | 24.4 |
| Example | 40 | 41 | 42 | 43 | 44 |
| PAA prepolymer | C | F | H | H | H |
| PAA acyl precursors | 60:40 Ox:Ur | 40:60 Ad[4]:Ur | 80:20 Ad:Ur | 80:20 Ad:Ur | 80:20 Ad:Ur |
| PAA (g) | 200.02 | 233.31 | 253.32 | 253.34 | 263.40 |
| PAA OS (g) | 50.74 | 58.38 | 63.55 | 63.56 | 66.08 |
| PAA amine (moles) | 0.270 | 0.285 | 0.267 | 0.267 | 0.277 |
| Epichlorohydrin (g) | 22.14 | 24.59 | 24.66 | 24.63 | 19.71 |
| Epichlorohydrin (moles) | 0.239 | 0.266 | 0.267 | 0.266 | 0.213 |
| Molar Epi:Amine ratio | 0.89 | 0.93 | 1.00 | 1.00 | 0.77 |
| Reaction conc HCl (g) | 0.00 | 0.00 | 0.00 | 0.00 | 0.00 |
| Reaction conc H2SO4 (g) | 3.15 | 0.00 | 1.07 | 0.00 | 0.00 |
| Reaction 6N NaOH (g) | 21.72 | 31.05 | 36.89 | 33.39 | 22.30 |
| Reaction time (hr) | 1.87 | 2.27 | 3.27 | 6.13 | 7.68 |
| Reaction temp (degC) | 29 | 29 | 29 | 35 | 35 |
| Reaction pH | 9.1 | 9.0 | 9.1 | 8.5 | 7.9 |
| Reaction OS (%) | 29.5 | 28.7 | 27.9 | 28.3 | 28.1 |
| Dilution water (g) | 66.96 | 50.91 | 50.18 | 50.16 | 50.51 |
| Quench conc HCl (g) | 18.13 | 20.36 | 21.85 | 21.69 | 17.15 |
| Product (g) | 332.12 | 360.22 | 387.97 | 383.21 | 373.07 |
| Product total solids (%) | 27.3 | 29.3 | 29.0 | 29.2 | 28.6 |
| Product OS (%) | 21.65 | 22.23 | 21.97 | 22.36 | 22.64 |
| Product DCP (dry OS ppm) | 19052 | 29566 | 28785 | 22425 | 8721 |
| Product CPD (dry OS ppm) | 8999 | 6400 | 6204 | 6907 | 7297 |
| Product viscosity (cP) | 105 | 128 | 133 | 144 | 88 |
| Product pH | 1.87 | 1.98 | 1.97 | 1.98 | 1.79 |
| Cured Wet/Dry Tensile (%) | 22.0 | 22.3 | 20.7 | 22.6 | 18.9 |
| Example | 45 | 46 | | | |
| PAA prepolymer | I | I | | | |
| PAA acyl precursors | Urea | Urea | | | |
| PAA (g) | 195.62 | 195.64 | | | |
| PAA OS (g) | 45.60 | 45.60 | | | |
| PAA amine (moles) | 0.266 | 0.267 | | | |
| Epichlorohydrin (g) | 24.64 | 24.63 | | | |
| Epichlorohydrin (moles) | 0.266 | 0.266 | | | |
| Molar Epi:Amine ratio | 1.00 | 1.00 | | | |
| Reaction conc HCl (g) | 0.00 | 0.00 | | | |
| Reaction conc H2SO4 (g) | 0.00 | 0.00 | | | |
| Reaction 6N NaOH (g) | 22.24 | 17.81 | | | |
| Reaction time (hr) | 1.77 | 5.22 | | | |
| Reaction temp (degC) | 29 | 30 | | | |
| Reaction pH | 9.0 | 8.5 | | | |
| Reaction OS (%) | 29.0 | 29.5 | | | |

TABLE 4-continued

| | | |
|---|---|---|
| Dilution water (g) | 50.34 | 50.66 |
| Quench conc HCl (g) | 17.12 | 13.06 |
| Product (g) | 309.96 | 301.80 |
| Product total solids (%) | 29.5 | 29.8 |
| Product OS (%) | 21.52 | 22.29 |
| Product DCP (dry OS ppm) | 42914 | 33303 |
| Product CPD (dry OS ppm) | 10240 | 10651 |
| Product viscosity (cP) | 120 | 118 |
| Product pH | 1.89 | 2.03 |
| Cured Wet/Dry Tensile (%) | 22.8 | 22.7 |

FOOTNOTES FOR TABLES 3 AND 4
[1]Ox-oxaloyl (from oxalic acid)
[2]Ur-carbonyl (from urea)
[3]1,3 DCP
[4]Ad-adipoyl (from adipic acid)

Finally, although the invention has been described with reference to particular means, materials, and embodiments, it should be noted that the invention is not limited to the particulars disclosed, and extends to all equivalents within the scope of the claims.

What is claimed is:

1. A process for preparing a tertiary amine polyamidoamine-epihalohydrin polymer, comprising reacting a tertiary amine polyamidoamine prepolymer and an epihalohydrin:
   (a) with a molar ratio, of epihalohydrin to tertiary amine groups in the polyamidoamine prepolymer, of less than 1.0:1.0;
   (b) at a pH of from about 7.5 to less than about 9.0;
   (c) in the presence of a nonhalide acid; and
   (d) at a temperature of not more than about 35° C.

2. The process of claim 1, further comprising maintaining the pH at from about 7.5 to less than about 9.0 by adding, to the reaction of the polyamidoamine prepolymer and the epihalohydrin, at least one member selected from the group of bases and nonhalide acids.

3. The process of claim 1, further comprising terminating the reaction of the polyamidoamine prepolymer and the epihalohydrin, by adding, to the reaction of the polyamidoamine prepolymer and the epihalohydrin, sufficient acid to convert substantially all oxirane groups in the reaction to chlorohydrin groups.

4. The process of claim 3, wherein the acid added for terminating the reaction of the polyamidoamine prepolymer and the epihalohydrin comprises nonhalide acid.

5. The process of claim 1, further comprising reacting the polyamidoamine prepolymer and the epihalohydrin in the substantial absence of halide acid.

6. The process of claim 5, further comprising terminating the reaction of the polyamidoamine prepolymer and the epihalohydrin, by adding, to the reaction of the polyamidoamine prepolymer and the epihalohydrin, sufficient acid to convert substantially all oxirane groups in the reaction to chlorohydrin groups.

7. The process of claim 6, wherein the acid added for terminating the reaction of the polyamidoamine prepolymer and the epihalohydrin comprises nonhalide acid, whereby halide acid remains substantially absent.

8. The process of claim 1, wherein the molar ratio, of epihalohydrin to tertiary amine groups in the polyamidoamine prepolymer, is from about 0.7:1 to less than 1.0:1.0.

9. The process of claim 8, wherein the pH is from about 8.0 to about 8.5.

10. The process of claim 9, wherein the temperature is from about 20° C. to about 35° C.

11. The process of claim 8, wherein the molar ratio, of epihalohydrin to tertiary amine groups in the polyamidoamine prepolymer, is from about 0.8:1 to 0.99:1.0.

12. The process of claim 11, wherein the molar ratio, of epihalohydrin to tertiary amine groups in the polyamidoamine prepolymer, is from about 0.85:1 to about 0.95:1.0.

13. The process of claim 12, wherein the molar ratio, of epihalohydrin to tertiary amine groups in the polyamidoamine prepolymer, is about 0.9:1.

14. The process of claim 1, wherein:
   (a) the epihalohydrin comprises epichlorohydrin; and
   (b) the tertiary amine polyamidoamine prepolymer comprises the reaction product of:
      (i) at least one member selected from the group consisting of saturated aliphatic dicarboxylic acids and nonacyl halide saturated aliphatic dicarboxylic acid derivatives; and
      (ii) at least one member selected from the group consisting of tertiary amine polyalkylenepolyamines.

15. The process of claim 14, wherein the tertiary amine polyamidoamine prepolymer comprises the reaction product of:
   (a) at least one member selected from the group consisting of $C_1-C_{12}$ saturated aliphatic dicarboxylic acids and nonacyl halide saturated aliphatic $C_1-C_{12}$ dicarboxylic acid derivatives; and
   (b) at least one member selected from the group consisting of tertiary amine polyalkylenepolyamines, wherein the at least one tertiary amine group comprises the at least one epihalohydrin reactive amine group, and also wherein the at least two amide forming amine groups comprise at least two primary amine groups.

16. The process of claim 15, wherein the nonhalide acid comprises at least one member selected from the group consisting of nitric acid, phosphoric acid, and sulfuric acid.

17. The process of claim 15, wherein the tertiary amine polyamidoamine prepolymer comprises the reaction product of:
   (a) urea; and
   (b) at least one tertiary amine polyalkylenepolyamine selected from the group consisting of N, N-bis (3-aminopropyl)methylamine and N, N-bis (2-aminoethyl)-methylamine.

18. The process of claim 17, wherein the tertiary amine polyamidoamine prepolymer further comprises the reaction product of at least one $C_1-C_{12}$ saturated aliphatic dicarboxylic acid.

19. The process of claim 18, wherein the molar ratio, of urea to the at least one $C_1-C_{12}$ saturated aliphatic dicarboxylic acid, is from about 40:60 to about 60:40.

20. The process of claim 18, wherein the at least one $C_1$–$C_{12}$ saturated aliphatic dicarboxylic acid comprises at least one member selected from the group consisting of oxalic acid and adipic acid.

21. The process of claim 1, further comprising reacting at least one member selected from the group consisting of saturated aliphatic dicarboxylic acids and nonacyl halide saturated aliphatic dicarboxylic acid derivatives, with at least one member selected from the group consisting of tertiary amine polyalkylenepolyamines, to form the tertiary amine polyamidoamine prepolymer.

22. The process of claim 21, wherein:
   (a) the saturated aliphatic dicarboxylic acids comprise $C_1$–$C_{12}$ saturated aliphatic dicarboxylic acids;
   (b) the nonacyl halide saturated aliphatic dicarboxylic acid derivatives comprise nonacyl halide $C_1$–$C_{12}$ saturated aliphatic dicarboxylic acid derivatives; and
   (c) the tertiary amine polyalkylenepolyamines comprise tertiary amine polyalkylenepolyamines wherein:
      (i) the at least one tertiary amine group comprises the at least one epihalohydrin reactive amine group; and
      (ii) the at least two amide forming amine groups comprise at least two primary amine groups.

23. A process for preparing a tertiary amine polyamidoamine-epihalohydrin polymer, comprising reacting a tertiary amine polyamidoamine prepolymer and an epihalohydrin:
   (a) with a molar ratio, of epihalohydrin to tertiary amine groups in the polyamidoamine prepolymer, of less than 1.0:1.0;
   (b) at a pH of from about 7.5 to less than about 9.0;
   (c) in the presence of a nonhalide acid; and
   (d) at a temperature sufficiently low to permit termination of this reaction prior to gelation of the tertiary amine polyamidoamine-epihalohydrin polymer.

24. The process of claim 23, further comprising maintaining the pH at from about 7.5 to less than about 9.0 by adding, to the reaction of the polyamidoamine prepolymer and the epihalohydrin, at least one member selected from the group of bases and nonhalide acids.

25. The process of claim 23, further comprising terminating the reaction of the polyamidoamine prepolymer and the epihalohydrin, by adding, to the reaction of the polyamidoamine prepolymer and the epihalohydrin, sufficient acid to convert substantially all oxirane groups in the reaction to chlorohydrin groups.

26. The process of claim 25, wherein the acid added for terminating the reaction of the polyamidoamine prepolymer and the epihalohydrin comprises nonhalide acid.

27. The process of claim 23, further comprising reacting the polyamidoamine prepolymer and the epihalohydrin in the substantial absence of halide acid.

28. The process of claim 27, further comprising terminating the reaction of the polyamidoamine prepolymer and the epihalohydrin, by adding, to the reaction of the polyamidoamine prepolymer and the epihalohydrin, sufficient acid to convert substantially all oxirane groups in the reaction to chlorohydrin groups.

29. The process of claim 28, wherein the acid added for terminating the reaction of the polyamidoamine prepolymer and the epihalohydrin comprises nonhalide acid, whereby halide acid remains substantially absent.

30. The process of claim 23, wherein the molar ratio, of epihalohydrin to tertiary amine groups in the polyamidoamine prepolymer, is from about 0.7:1 to less than 1.0:1.0.

31. The process of claim 23, further comprising reacting at least one member selected from the group consisting of saturated aliphatic dicarboxylic acids and nonacyl halide saturated aliphatic dicarboxylic acid derivatives, with at least one member selected from the group consisting of tertiary amine polyalkylenepolyamines, to form the tertiary amine polyamidoamine prepolymer.

32. The process of claim 31, wherein:
   (a) the saturated aliphatic dicarboxylic acids comprise $C_1$–$C_{12}$ saturated aliphatic dicarboxylic acids;
   (b) the nonacyl halide saturated aliphatic dicarboxylic acid derivatives comprise nonacyl halide $C_1$–$C_{12}$ saturated aliphatic dicarboxylic acid derivatives; and
   (c) the tertiary amine polyalkylenepolyamines comprise tertiary amine polyalkylenepolyamines wherein:
      (i) the at least one tertiary amine group comprises the at least one epihalohydrin reactive amine group; and
      (ii) the at least two amide forming amine groups comprise at least two primary amine groups.

* * * * *